United States Patent
Majima (10) Patent No.: US 7,695,749 B2
(45) Date of Patent: Apr. 13, 2010

(54) METHOD OF PREPARING SUSHI RICE

(75) Inventor: Junji Majima, Machida (JP)

(73) Assignee: Kabushiki Kaisha Audio-Technica, Machida-shi, Tokyo (JP)

(*) Notice: Subject to any disclaimer, the term of this patent is extended or adjusted under 35 U.S.C. 154(b) by 981 days.

(21) Appl. No.: 11/447,156

(22) Filed: Jun. 6, 2006

(65) Prior Publication Data
US 2006/0225578 A1    Oct. 12, 2006

Related U.S. Application Data

(63) Continuation of application No. 11/071,181, filed on Mar. 4, 2005, now abandoned.

(30) Foreign Application Priority Data
Mar. 8, 2004    (JP)    ............................. 2004-063864

(51) Int. Cl.
    A47J 27/00    (2006.01)
(52) U.S. Cl. .................. 426/519; 426/524; 99/348; 99/468; 99/470; 366/145
(58) Field of Classification Search ................ 426/519, 426/524; 99/328, 348, 455, 468, 470; 366/145, 366/146, 149, 601
See application file for complete search history.

(56) References Cited

U.S. PATENT DOCUMENTS

| | | | | |
|---|---|---|---|---|
| 5,169,231 A * | 12/1992 | Suzuki | ........................ | 366/105 |
| 5,363,746 A * | 11/1994 | Gordon | ........................ | 99/328 |
| 6,367,963 B2 * | 4/2002 | Sanpei et al. | ................ | 366/233 |
| 6,770,312 B1 * | 8/2004 | Yamamoto et al. | ........... | 426/302 |
| 2001/0023642 A1 * | 9/2001 | Sanpei et al. | .................. | 99/446 |
| 2005/0025860 A1 * | 2/2005 | Hatakenaka | .................. | 426/17 |

* cited by examiner

*Primary Examiner*—Drew E Becker
*Assistant Examiner*—Steven Leff
(74) *Attorney, Agent, or Firm*—Manabu Kanesaka (57) ABSTRACT

A method of controlling a food processor includes retaining in a container cooked rice and sushi dressing in a predetermined ratio, mixing the cooked rice and the sushi dressing in the container to perform a mixing process, and cooling the cooked rice and the sushi dressing with air to perform a cooling process. The mixing process and cooling process are performed intermittently according to a cooling-mixing process, which comprises a plurality of cycles carried out repeatedly. One cycle includes one-cooling operation, having a standstill duration, for merely sending air while keeping the cooked rice without mixing, and another-cooling operation for sending air while mixing the cooked rice. The standstill duration of the one-cooling operation is gradually prolonged in every predetermined number of the cycles.

7 Claims, 6 Drawing Sheets

PRIOR ART

FIG. 8

METHOD OF PREPARING SUSHI RICE

CROSS-REFERENCE TO RELATED APPLICATION

This is a continuation application of Ser. No. 11/071,181 filed on Mar. 4, 2005.

TECHNICAL FIELD

The present invention relates to a method of controlling a food processor for producing vinegared rice by mixing cooked rice with sushi dressing and, more particularly, to a method of controlling a food processor that can produce delicious and good-texture vinegared rice, suppressing stickiness of the cooked rice.

BACKGROUND ART

In general, the vinegared rice is produced by spreading cooked rice in a container such as a sushi-rice tub, by mixing by means of a rice paddle the cooked rice with sushi dressing in which vinegar, sugar, and the like are blended in a predetermined ratio that depends on the measure of the cooked rice, the sushi dressing being sprinkled on the cooked rice, and by cooling the cooked rice to human-body temperature using a paper fan or the like.

In this situation, it is said to be preferable to mix the cooked rice with the sushi dressing as if the cooked rice were sliced by the rice paddle. This is to apply as less load as possible to the cooked rice; mashing the surfaces of the cooked rice through friction caused by the rice paddle makes the rice sticky, thereby degrading the taste and texture thereof.

Meanwhile, at places, such as restaurants, hotels, and cooked-rice processing plants, where a great deal of cooked rice is consumed, because it is necessary to prearrange a great deal of vinegared rice at one time, the vinegared rice is produced by automatically mixing the cooked rice with sushi dressing by means of dedicated food processors.

For example, a food processor disclosed in Patent Literature 1 (Japanese Utility Model Application Publication No. H5-39433) is structured in such a way that a horizontal rotating-axle rotatably supports a sphere-shaped container on the main body of the processor and the container is rotated by means of predetermined mixing means. The processor is designed in such a manner that a supplying opening for a blower as cooling means is formed at the one end of the horizontal rotating-axle; at the other end of the horizontal rotating-axle, an air-discharging outlet for the container is formed; and air sent from the blower cools cooked rice in the container.

According to Patent Literature 1, by sending air into the container and rotating the container on the horizontal rotating-axle, the cooked rice and sushi dressing that have been put into the container are cooled and appropriately mixed with each other, whereupon a great deal of vinegared rice can be produced.

Figure 8:
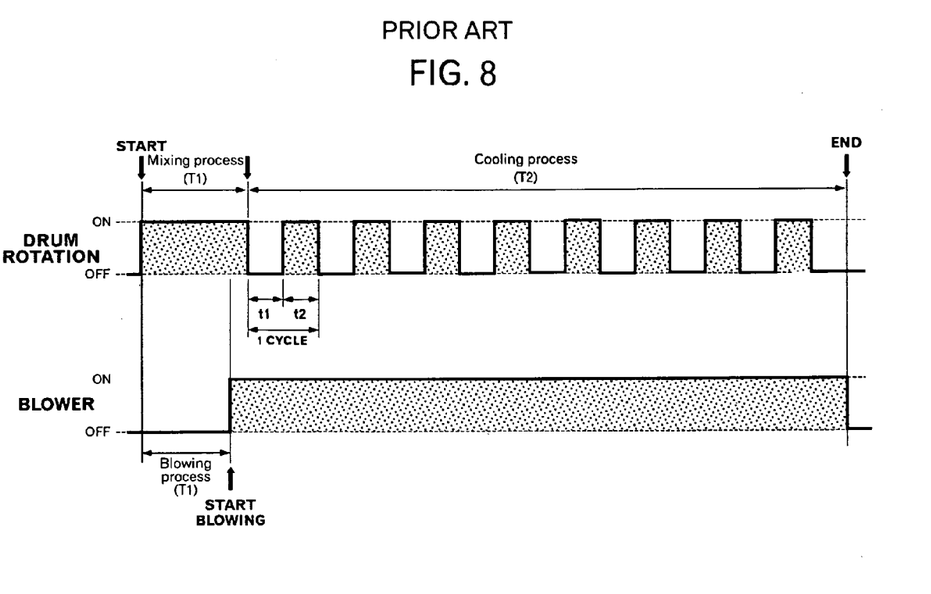
FIG. 8 is an explanatory view for explaining the operational sequence of a conventional food processor.

In such a food processor as described above, the operation of the mixing means and the cooling means are controlled by unillustrated controlling means. In other words, as represented in FIG. 8, the controlling means includes a mixing process in which, once cooked rice and sushi dressing are put into the container, the cooked rice and the sushi dressing are mixed by merely rotating the container over a certain-period of time, and a cooling process in which the cooked rice is cooled by repeating at a certain interval of time rotating and stopping of the container, sending air into the container; whereby vinegared rice can efficiently be produced within a period of time that is set. In addition, the setting of conditions for each process is implemented by an operator, an operational panel being operated by him or her, before the operation of the processor is initiated.

However, conventional food processors had a problem described below. That is to say, in a conventional food processor, standstill duration (t1) and rotating duration (t2) are set for the container in the cooling process; the standstill and the rotation of the container is considered as one cycle based on the set duration; and the cycle is repeated within duration that is set.

Moreover, as set forth above, the lower the temperature is, the lower the fluidity of cooked rice is, thereby creating difficulty in mixing the cooked rice. When the cooked rice in its low temperature is mixed, the surfaces of the cooked rice grains are mashed through contact between the surfaces of the cooked rice grains and the inner wall of the container or a mixing rod.

Therefore, in the case of operation, as represented in FIG. 8, that simply repeats the rotation and the standstill, the number of the rotation becomes unnecessarily large, thereby inducing the stickiness of the cooked rice. The stickiness caused in cooked rice degrades the taste and the texture of vinegared rice.

SUMMARY OF THE INVENTION

In order to address the foregoing problem, the present invention has been implemented, and it is an object of the present invention to provide a method of controlling a food processor that can produce delicious and good-texture vinegared rice, suppressing the stickiness of cooked rice.

In order to achieve the object described above, the present invention has a number of features described below. In the first place, in a food processor including a container for retaining cooked rice and sushi dressing blended with each other in a predetermined ratio that depends on the measure of the cooked rice, mixing means for mixing the cooked rice in the container, cooling means for cooling with air the cooked rice in the container, controlling means for controlling the mixing means and the cooling means, the controlling means includes a cooling process for intermittently mixing the cooked rice through the mixing means while sending air into the container through the cooling means; in the cooling process, standstill-cooling (one-cooling) operation for merely sending air through blowing means while keeping the cooked rice not to be mixed, and mixing-cooling (another-cooling) operation for sending air through the blowing means white mixing the cooked rice, constitute a cycle, the cycle being recurrently carried out within the cooling process, and standstill duration of the standstill-cooling operation is set in such a way as to gradually be prolonged every predetermined number of the cycles.

According to the present invention, the operating duration of the standstill-cooling operation in the cooling operation gradually becomes longer as time passes, thereby making the number of mixing rotations in the cooling operation relatively reduced, whereby the generation of stickiness caused by the decrease of cooked-rice temperature can be suppressed.

As a preferred aspect, the operating duration of the mixing-cooling operation is preferably constant in each cycle. This allows control to be carried out only for standstill-cooling operation, thereby facilitating the control.

Moreover, given that the operating duration, in the first cycle, of the standstill-cooling operation is t1, prolonged duration for the operating duration of the standstill-cooling operation is k (k is a positive number), and the operating duration, in the n-th cycle (n is a positive integer), of the standstill-cooling operation is tn, the operating duration, in the n-th cycle (n is a positive integer), of the standstill-cooling operation tn is preferably set so as to meet the equation: $tn=t1+((n-1)\times k)$.

According to this aspect, prolonging cycle by cycle the operating duration of the standstill-cooling operation can continuously reduce the number of the mixing rotations in response to the decrease of cooked-rice temperature. Furthermore, given that the total duration of the cooling process is T, that the operating duration, in the first cycle, of the standstill-cooling operation is t1, that the operating duration of the mixing-cooling operation is t2, that the prolonged duration for the operating duration of the standstill-cooling operation is k (k is a positive number), and that the operating duration of the standstill-cooling operation is prolonged in m (m is a positive integer) incremental steps within the total duration T, by calculating the average cycle-duration Cave through the equation $Cave=t2+(t1\times m+m(m-1)\times k/2)/m$ and by calculating with the foregoing average cycle-duration Cave the total cycle number n in the total duration T of the cooling process through the equation $n=T/Cave$, the operating duration of the standstill-cooling operation is prolonged every n/m cycles that is obtained by multiplying the total cycle number n by 1/m.

According to this aspect, by calculating the total cycle number in the total duration of the cooling process, by dividing the total cycle into a number of portions, and by prolonging the operating duration of the standstill-cooling operation portion by portion, quadratic-curve-like operation control can be carried out in response to the decrease of cooked-rice temperature.

As another aspect, given that the total duration of the cooling process is T, that the operating duration, in the first cycle, of the standstill-cooling operation is t1, that the operating duration of the mixing-cooling operation is t2, that the prolonged duration for the operating duration of the standstill-cooling operation is k (k is a positive number), and that the operating duration of the standstill-cooling operation is prolonged in m (m is a positive integer) incremental steps within the total duration T, the total operating duration in the m-th step Tm is given by $Tm=T/m$; the operating duration of one cycle in the m-th step Cm is given by $Cm=(t1+((m-1)\times k))+t2$; and the cycle is recurrently carried out (Tm/Cm) times within each of the operating duration Tm.

According to this aspect, by dividing the total duration of the cooling process into a number of portions, and by prolonging the operating duration of the standstill-cooling operation portion by portion, the number of the mixing rotations can effectively be reduced.

As a preferred aspect, the controlling means preferably includes a mixing process for mixing the cooked rice through the mixing means, without sending air into the container. According to this aspect, the sushi dressing can be made to fit in the cooked rice because the cooked rice being put in the container can be mixed with sushi dressing, in the first place.

As a further preferable aspect, a maturing process in which both the mixing means and the cooling means stop is preferably included between the mixing process and the cooling process. According to this aspect, maturing (steaming) can be carried out after the end of the mixing process.

DETAILED DESCRIPTION

An embodiment of the present invention will be discussed referring to the drawings.

Figure 1:
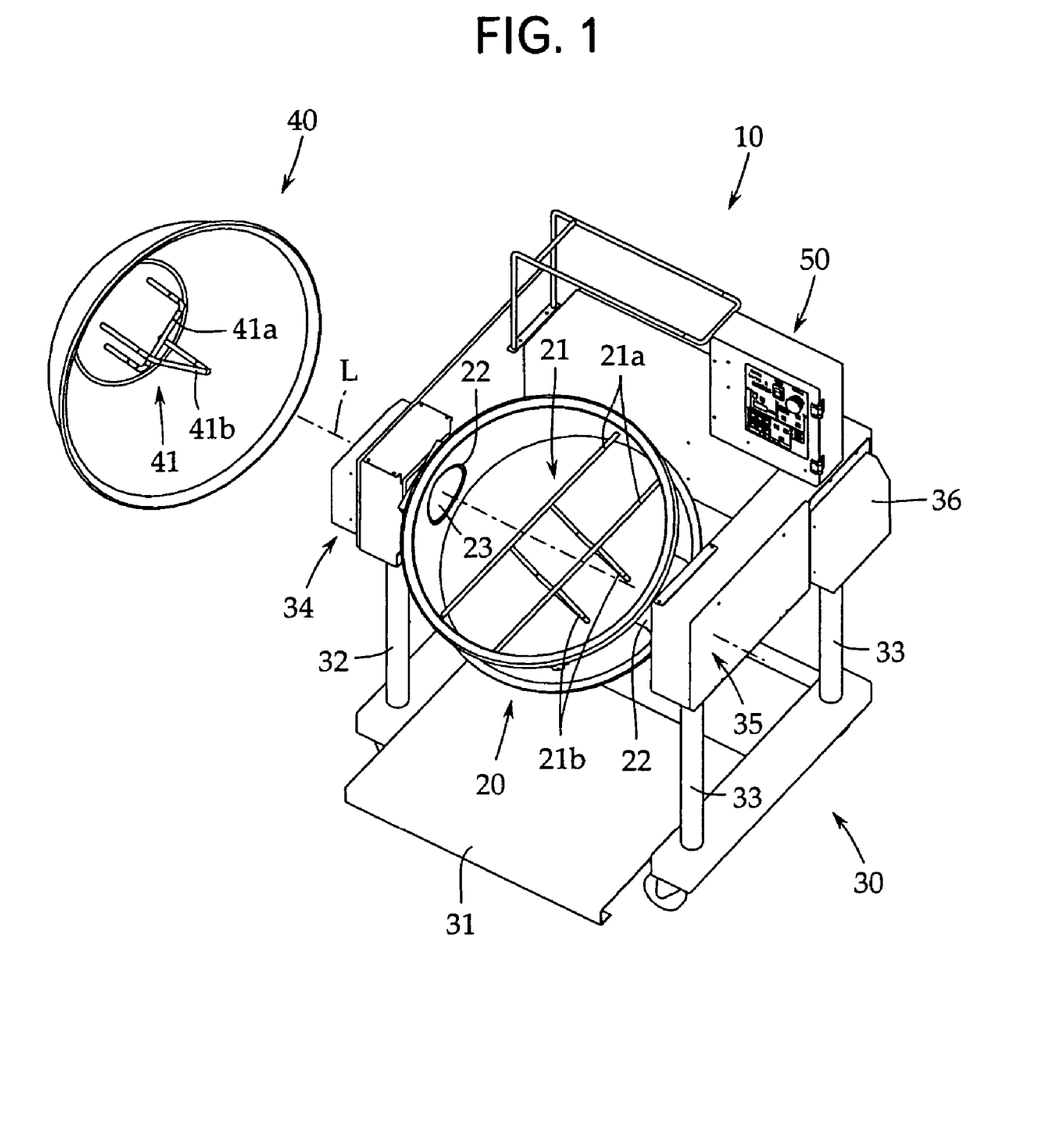
FIG. 1 is a perspective view of a food processor according to an embodiment of the present invention.

FIG. 1 is an exploded perspective view of a cooked-rice processor according to an embodiment of the present invention; A food processor 10 includes a container 20 that is formed in the shape of a hollow sphere, and a main body 30, of the processor, that supports the container 20, by means of an axle, in such a way that the container 20 can rotate on a predetermined horizontal rotating-axis L as a central axis. The container 20 is detachable from and attachable to the main body 30.

A detachable lid 40 is provided on the container 20. Disposing the lid 40 on the container 20 makes the hollow an enclosed space. In addition, in FIG. 1, the lid 40 is illustrated being removed.

The inner surface of the container 20 is preferably provided with resistance processing for preventing acid corrosion caused by adhesion of cooked rice or by sushi dressing. In the present embodiment, as the resistance processing, resistance coating with fluoride resin is applied.

Inside the container 20, a mixing rod 21 is provided for mixing cooked rice being put into the container with sushi dressing, appropriately loosening the cooked rice. The mixing rod 21 includes two main rod members 21a that are hung in a diametrical direction across the inside of the container and two sub rod members 21b that are provided between the main rod members. The mixing rod 21 is formed to be tilted by a predetermined angle from the rotating-axle line L.

In addition, the foregoing resistance processing is preferably applied also to the mixing rod 21. In the present embodiment, the mixing rod 21 is made of the combination of two kinds of the rod members 21a, and 21b; however, the shape of the mixing rod 21 is not specifically limited and can arbitrarily be changed depending on specification.

The container 20 is provided with supporting axles 22, 22 for rotatably supporting the container 20 on the main body 30. The supporting axles 22, 22 are disposed, facing each other, in the side walls of the container 20, along the rotating-axle line L, and are formed in the form of a hollow cylindrical pipe.

In the one supporting axle 22, an air-inlet 23 is formed for taking into the container 20 air supplied from blowing means (a blower) provided in the main body 30; in the other supporting axle 22, an air-outlet (not illustrated) is provided for discharging the air being inside the container 20.

The lid 40 is formed in the form of a detachable and attachable hemisphere whose circumference is along the opening of the container 20; as is the case with the container 20, resistance processing is applied to the inner surface of the lid. The lid 40 is fixable on the container 20 using locking means.

A mixing rod 41 that is disposed in a manner of protruding toward the inside of the container 20 is provided inside the lid 40. The mixing rod, 41 is constituted in such a way that U-shaped rod members 41a and 41b whose heights are different from each other are alternately arranged and is situated in the place where the mixing rod 41 does not interfere with the mixing rod 21 inside the container 20. In addition, resistance processing is preferably applied also to the mixing rod 41.

Referring again to FIG. 1, the main body 30 includes a base 31 that is installed on a horizontal installation plane such as a floor, a pair of support posts 32, 33, and bearing portions 34 and 35 that are integrally disposed on the respective support posts 32, 33 and that rotatably support the supporting axles 22 of the container 20. The base 31, the supporting posts 32, 33, and the bearing portions 34 and 35 are made of stainless-steel having high corrosion-resistance.

The base 31 is a stand whose bottom portion is provided with traveling casters, and the respective supporting posts 32 and 33 are stood on the four corners of the base 31.

Inside the one bearing portion 34, an unillustrated blower (cooling means) is contained for sending through the supporting axle 22 air into the inside of the container 20. In this example, the blower draws in air through an air-inlet provided at the one side of the bearing portion 34 and then sends through the supporting axle 22 the air into the container 20 by way of a sirocco fan (not illustrated) in the bearing portion 34. In addition, the constitution of the blower can arbitrarily be changed depending on specification as long as air can be sent into the container 20.

Inside the other bearing portion 35, an unillustrated driving system (mixing means) is contained for rotating the container 20 on the horizontal axis line L. In this example, the driving system includes a driving motor, and a transmission gear for transmitting the rotation-driving force of the driving motor to the supporting axle 22 for the container 20 (both the motor and the gear are not illustrated); however, the constitution of the driving system is not specifically limited as long as the driving system is structured in such a manner that it can rotatably drive the container 20.

In the bearing portion 35, an unillustrated air-discharging path is also provided for discharging air that has been utilized for cooling operation in the container 20. The one end of the air-discharging path is connected to the other supporting axle 22, and the other end thereof is connected to an air-discharging portion 36 provided at the side of the bearing portion 35; the air is discharged through the air-discharging portion 36.

Because the air that has been utilized for cooling contains a great deal of acid of sushi dressing, it adversely affects the surrounding environment. In order to address this, the air-discharging portion 36 is preferably provided with an acid-removing filter for removing acid contained in the discharged air.

In a place that is at the rear side of the food processor 10 and is on the bearing portion 35, an operational panel 50 is provided for operating the food processor 10. On the operational panel 50, various kinds of lamps such as a pilot lamp, a display for displaying operational status and the like, and various kinds of buttons such as a start button, an emergency stop button are also provided. The operational panel 50 has a built-in microcomputer as controlling means, and the total operation, of the processor, including the foregoing mixing means and the blowing means is controlled through the controlling means.

In the present invention, the specification for the food processor 10 is not limited, as long as the processor is provided fundamental structure for rotating the container, thereby mixing the cooked rice therein. In other words, the present invention may be applied, for example, to a type of food processor, disclosed in Japanese Patent Application Publication No. 2002-253191, in which the container 20 is supported in a cantilever-like fashion.

Next, referring to FIG. 2, the processes for producing vinegared rice, of the food processor 10, will be discussed. The food processor 10 includes a mixing process 100 for mixing cooked rice with sushi dressing and a cooling process 200 for cooling the mixed vinegared rice by means of air. Both the mixing process 100 and the cooling process 200 are controlled by the controlling means.

Figure 2:
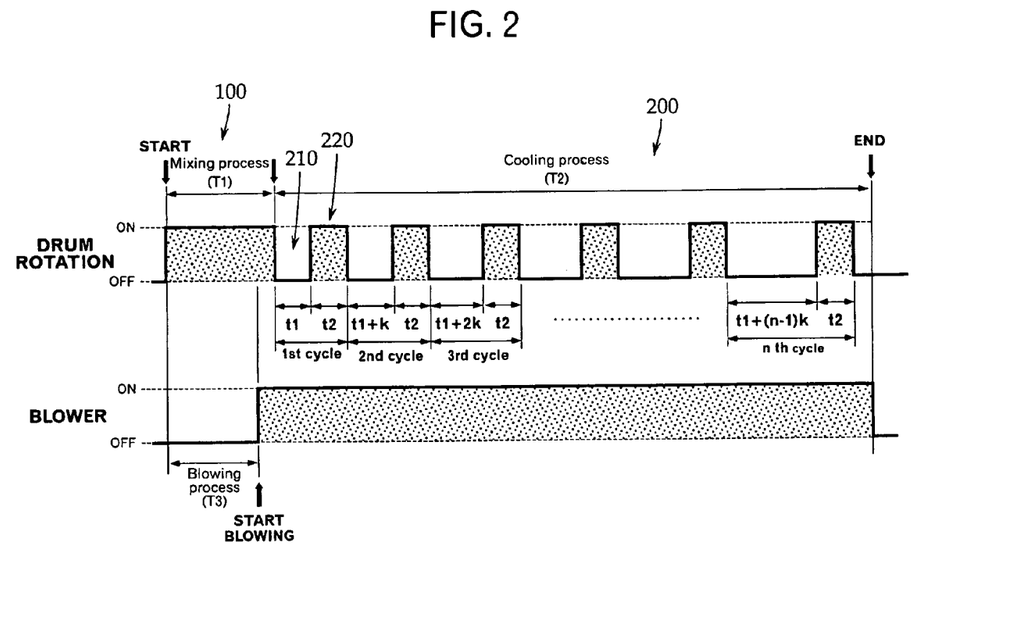
FIG. 2 is an explanatory view for explaining the operational sequence of the mixing and cooling processes of the food processor.

As illustrated in FIG. 2, the mixing process 100 is an initial process for blending cooked rice with sushi dressing and the container 20 is rotated at the constant rotating velocity, within set operating duration (T1). On this occasion, when a predetermined duration (T3) has passed after the start of mixing, the blowing means (blower) is switched on, thereby initiating blowing. In addition, the operating duration T1 of the mixing process 100 and the duration T3 corresponding to the operation-starting timing can arbitrarily be set by the foregoing operational panel 50.

The cooling process 200 is to lower in the predetermined duration (T2) the temperature of the vinegared rice that has been mixed with the sushi dressing in the mixing process 100 prior thereto. The cooling process 200 includes standstill-cooling operation 210 for merely sending air-through the blowing means, halting the rotation of the container 20 and mixing-cooling operation 220 for sending air through the blowing means, rotating the container 20; the standstill-cooling operation 210 and the mixing-cooling operation 220 in that order are regarded as one cycle, and that one cycle is repeated within the duration (T2).

The present invention is characterized by prolonging the operating duration of the standstill-cooling operation 210 as time passes. In other words, in the present example, the standstill-cooling operation 210 is set in such a way that, given that the operating duration, in the first cycle, of the standstill-cooling operation 210 is t1, prolonged duration for the operating duration of the standstill-cooling operation 210 is k (k is a positive number), and the operating duration in the n-th cycle (n is a positive integer) is tn, the operating duration in the n-th cycle (n is a positive integer) tn meats the following equation:

$$tn = t1 + ((n-1) \times k)$$

In addition, in the present example, the operating duration t2 of the mixing-cooling operation is constant in each cycle.

The total operating duration T2 of the cooling process, the operating duration t1 of the standstill-cooling operation 210 in the first cycle, and the operating duration t2 of the mixing-cooling operation are inputted through the operational panel 50 described above. Moreover, in the present example, the prolonged duration k is an invariable value preset by the controlling means; however, the prolonged duration k may be inputted through the operational panel 50 depending on specification.

According to the present example, the operating duration t1 to tn of the standstill-cooling operation 210 gradually becomes longer as time passes, thereby making the accumulated duration of the operating duration t2 of the mixing-cooling operation relatively short compared to the total operating duration T2, whereupon the mixing duration for the vinegared rice is reduced, thereby enabling suppression of the generation of stickiness in the vinegared rice.

In the foregoing embodiment, the mixing process 100 is followed by the cooling process 200; however, in some cases, cooked rice and sushi dressing are made to fit in each other to change the taste of the rice. As an example of this, there is an approach in which taste is matured by steaming the vinegared rice after the cooked rice has been mixed with the sushi dressing.

Figure 3:
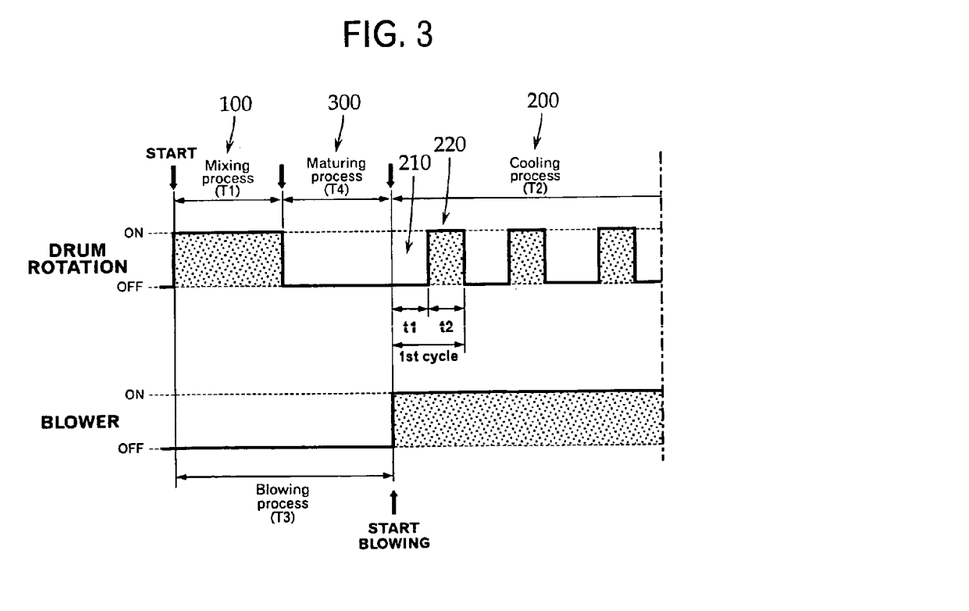
FIG. 3 is an explanatory view for explaining the operational sequence of the maturing process.

For that purpose, as represented in FIG. 3, the controlling means preferably performs a maturing process 300 between the mixing process 100 and the cooling process 200. The maturing process 360 is to steam within preset duration (T4) the vinegared rice in the container, with both the mixing means and the cooling means being completely halted. The operating duration (T4) of the maturing process can also be inputted through the operational panel 50.

After the maturing process 300 has been completed, the cooling process 200 is started with the standstill-cooling operation 210 followed by the mixing-cooling operation 220; however, by regarding a portion of the standstill duration in the maturing process 300 as the standstill-cooling operation 210 in the first cycle, the mixing-cooling operation 220 may precede the standstill-cooling operation 210.

Figure 4:
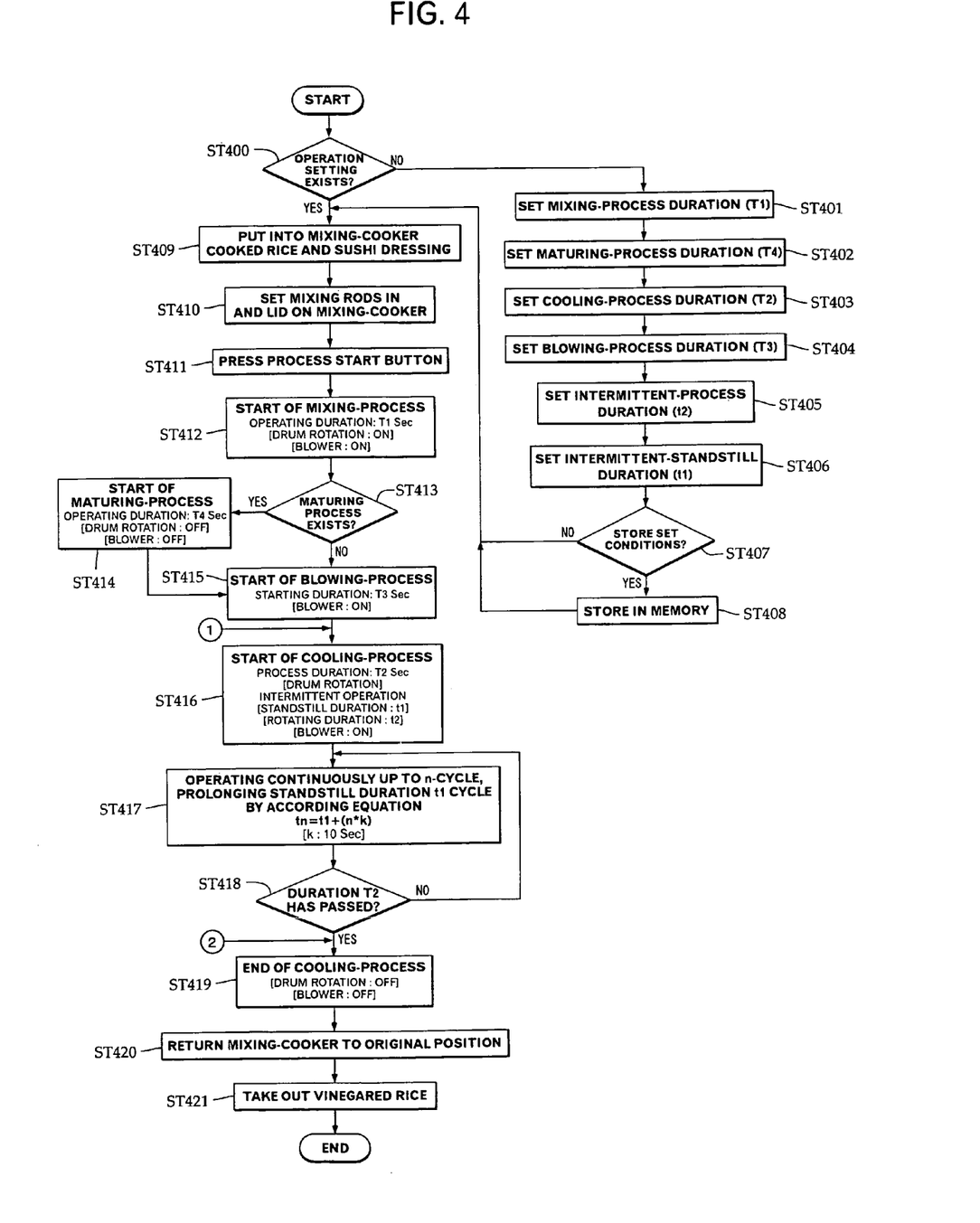
FIG. 4 is a flowchart for explaining the mixing operation of the food processor according to the foregoing embodiment.

Next, referring to FIGS. 1 and 4, an example of controlling means of the food processor will be discussed utilizing a flowchart. In starting the mixing operation, after receiving memory-call from an operator, the controlling means retrieves a setting memory in the operational panel 50 to determine whether any setting for operational conditions are stored or not (step ST400).

When there is no setting stored, the operator inputs each of conditions through various kinds of consoles provided on the operational panel 50. In the first place, the operating duration T1 of the mixing process 100 is inputted (step ST401). Then, the operating duration T4 of the maturing process 300 is inputted; in this situation, inputting zero as the duration T4 makes the controlling means determine that the maturing process 300 does not exist (step ST402).

Further in the next step, after the operating duration T2 of the cooling process 200 (Step ST403), the duration T3 corresponding to the operation-starting timing (step ST404) of the blowing means, the operating duration t1 (Step ST405), in the first cycle, of the standstill-cooling operation, and the operating duration of the mixing-cooling operation (step ST406) are inputted, thereby completing all inputting, it is determined whether the conditions set are to be stored or not (step ST407).

In the case where the conditions set are stored, they are stored by writing the set conditions in the setting memory (step ST408). After storing the setting, or determining that no setting is to be stored, the controlling means makes the food processor enter into a standby state from which the food processor is initiated merely by pushing the operation start button on the operational panel 50.

Before operating the operation start button, the operator puts into the container 20 the cooked rice and the sushi dressing blended depending on the measure of the cooked rice (step ST409) and sets the lid 40 (step ST410) after mounting the mixing rods 21 and 41 in the container 20. After confirming that the setting is completed, the operation is initiated by the operator's pushing the operation start button (step ST411).

After acknowledging the operation of the operation start button, the controlling means starts the mixing process 100 (step ST412). Next, the controlling means issues a driving command to driving means, thereby driving the driving means during the operating duration T1 that has been set in ST401.

After the operating duration T1 of the mixing process 100 passes, the operating means checks whether the Maturing process 300 exists or not (step ST413). When it is determined that the maturing process 300 exists, the controlling means issues a stop command to the driving means, thereby stopping the rotation of the container 20, based on the set duration T4 (step ST414).

In addition, in the maturing process 200, the duration T3 corresponding to the blowing starting timing is counted by an unillustrated timer; when the blowing process 200 and the maturing process 300 overlap with each other, the maturing process 300 is prioritized; when the blowing timing is set in the maturing process 300, the air sending by the blower is started immediately after the completion of the maturing process 300. Moreover, it is also possible to set the driving means in such a way as to start driving the blowing means in the middle of the cooling process 200.

When the maturing process 300 has been completed, or when the controlling means determines that the maturing process does not exist, the controlling means issues a driving command to the blower, based on the duration T3 corresponding to the blowing starting timing, thereby-driving the blower to send air into the container 20 (step ST415). In addition, in the present example, a blower-operation stop command and an operation-stop command for the subsequent cooling process are issued at the same time.

Next, the controlling means initiates the cooling process 200 (step ST416). In the cooling process 200, with the blower being kept on, driving and driving-stop commands are issued to the driving means, based on the cooling-process duration T2, the standstill-cooling-operation duration t1, and the mixing-cooling-operation duration t2 that have been inputted in steps ST 403, 405, and 406, respectively, thereby intermittently rotating the container 20.

The controlling means controls the operating durations of the driving means in such a way that the equation $tn = t1 + ((n-1)-k)$ holds for tn that is the operating duration in the n-th cycle (n is a positive integer), thereby intermittently carrying out the cycle within the operating duration T2 (step ST418). In other words, for example, setting the prolonged duration k to 10 seconds makes the standstill-cooling-operation duration 10 seconds longer cycle by cycle.

On the completion of the cooling process 200, the controlling means issues a stop command to the blower, thereby stopping blowing by the blower (step ST419). At the same time, the controlling means again issues a command to the driving means, thereby returning the posture of the container 20 to its original one (ST420). A series of operation ends here, and the controlling means returns to be standby-state. Thereafter, the operator removes the lid 40 of the container 20 and takes completed vinegared rice out of the container 20; then, the total production process for the vinegared rice ends (step ST 421).

Figure 5A:
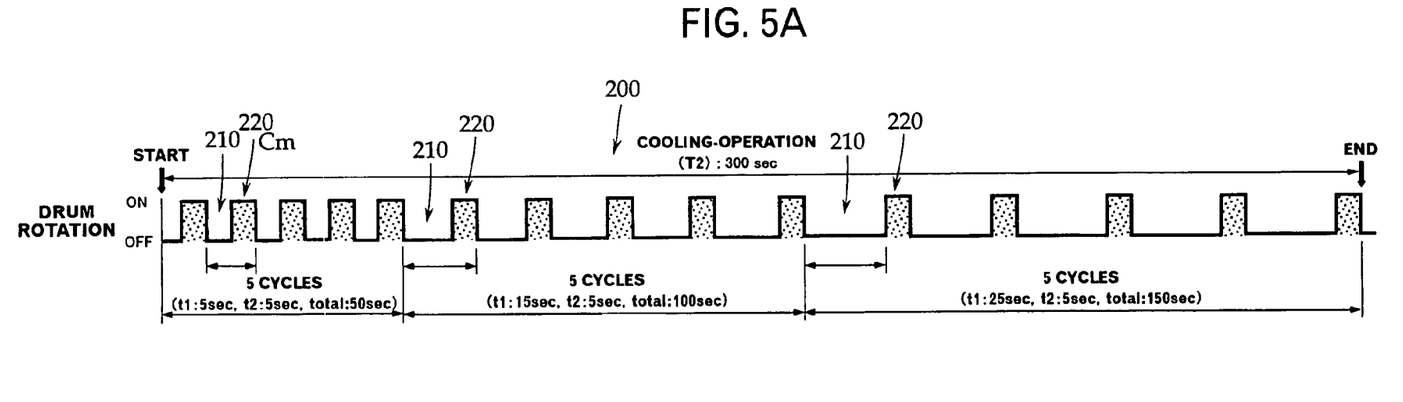
FIG. 5A is an explanatory view for explaining a first variant example of the operational sequence of the cooling process.

Next, FIG. 5A represents a first variant example of the cooling process. As represented in FIG. 5A, in the first variant example, given that the total cooling-process duration is T2, that the operating duration, in the first cycle, of the standstill-cooling operation 210 is t1, that the operating duration of the mixing-cooling operation 220 is t2, and that prolonged duration for the operating duration of the standstill-cooling operation 210 is k (k is a positive number), the operating durations of the standstill-cooling operation 210 are prolonged in m incremental steps (three steps, in this case).

That is to say, in the first place, by calculating the average cycle-duration Cave of cycles in the m-th step, through the equation Cave=t2+(t1×m+m (m−1)×k/2)/m and by calculating with the foregoing average cycle-duration Cave the total cycle number n in the total duration T2 of the cooling process 200 through the equation n=T2/Cave, the operating duration of the standstill-cooling operation 210 is prolonged every n/m cycles that is obtained by multiplying the total cycle number n by 1/m. In addition, the step number m can arbitrarily be set according to specification.

According to the first variant example, by calculating the total cycle number in the total duration of the cooling process, by dividing the total cycle into a number of portions, and by prolonging the operating duration of the standstill-cooling operation portion by portion, quadratic-curve-like operation control can be carried out in response to the decrease of the cooked-rice temperature.

Figure 6:
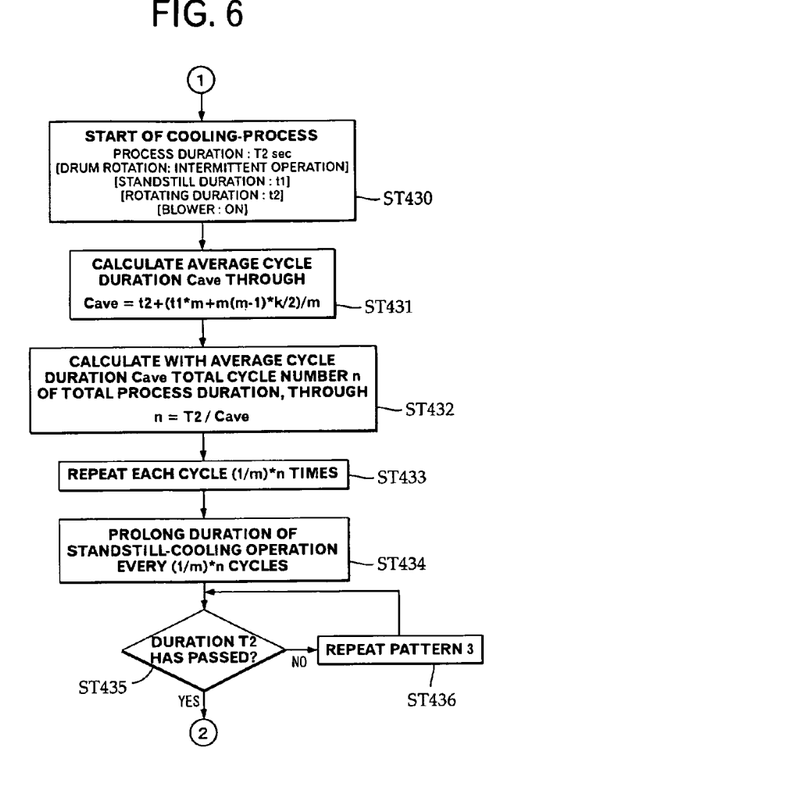
FIG. 6 is a flowchart for explaining the mixing operation according to the first variant example.

Referring to FIG. 6, the controlling mode of the first variant example will be discussed utilizing a flowchart.

Because each of the process from the start to the end of the maturing process and the process from the end of the cooling process to the completion is the same as that of the foregoing embodiment, the explanation therefor will be omitted.

After the maturing process 300 ends, the controlling means initiates the cooling process 200 (step ST430). In the cooling process 200, with the blower being kept on, the controlling means calculates the duration to be set, based on the cooling-process duration T2, the standstill-cooling-operation duration t1, and the mixing-cooling-operation duration t2 that have been inputted in step ST 403, 405, and 406 in FIG. 4, respectively. After the calculation, the controlling means issues driving and driving-stop commands to the driving means, thereby intermittently rotating the container 20.

In this situation, the controlling means calculates the average cycle-duration Cave of cycles in the m-th step, through the equation Cave=t2+(t1×m+m (m−1)×k/2)/m (step ST431).

At the same time, the controlling means calculates with the average cycle-duration the total cycle number n in the total duration T2 of the cooling process 200, through the equation n=T2/Cave (step ST432).

Based on this information, the controlling means repeats each cycle (1/m)×n times (step ST433). The operating duration of the standstill-cooling operation 210 is prolonged every n/m cycles that is obtained by multiplying the total cycle number n by 1/m. (step ST434).

Upon ending the step ST434, the controlling means once checks whether the cooling-process duration T2 has passed or not (step ST435). If determining that the cooling-process duration T2 is still remaining, the controlling means carries out control so as to repeat the final cycle within the residual duration (step ST436). After the duration passes, the controlling means moves to step ST419 in FIG. 4.

Referring to FIG. 6, the controlling mode of the first variant example will be discussed utilizing a flowchart. Because each of the process from the start to the end of the maturing process and the process from the end of the cooling process to the complete stop is the same as that of the foregoing embodiment, the explanation therefor will be omitted.

After the maturing process 300 ends, the controlling means initiates the cooling process 200 (step ST430). In the cooling process 200, with the blower being kept on, the controlling means calculates the duration to be set, based on the cooling-process duration T2 seconds, the standstill-cooling-operation duration t1, and the mixing-cooling-operation duration t2 that have been inputted in steps ST 403, 405, and 406 in FIG. 4, respectively, and issues a driving and a driving-stop command to the driving means, thereby intermittently rotating the container 20.

Figure 5B:
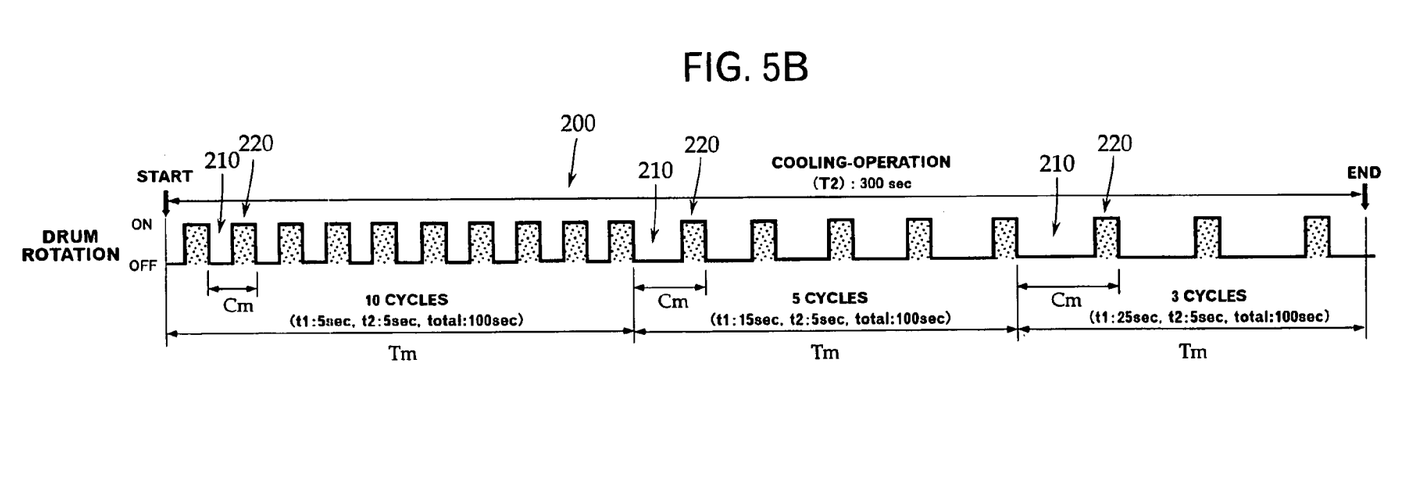
FIG. 5B is an explanatory view for explaining a second variant example of the operational sequence of the cooling process.

Next, FIG. 5B represents a second variant example of the cooling process. In the second variant example, given that the total cooling-process duration is T2, that the respective operating time periods of the standstill-cooling operation and the mixing-cooling operation, in the first cycle, are t1 and t2, and that prolonged duration for the operating duration of the standstill-cooling operation is k (k is a positive number), the operating durations of the standstill-cooling operation 210 are prolonged in m incremental steps (three steps, in this case).

In other words, in the second variant example, the operating duration Tm for each step is obtained by evenly dividing the total operating duration T by the number of the steps m (Tm=T/m); the operating duration of one cycle in the m-th step Cm is obtained by calculating through the equation Cm=(t1+((m−1)×k))+t2; and, utilizing the results calculated, the cooling cycle is recurrently carried out (Tm/Cm) times within each operating duration Tm.

Figure 7:
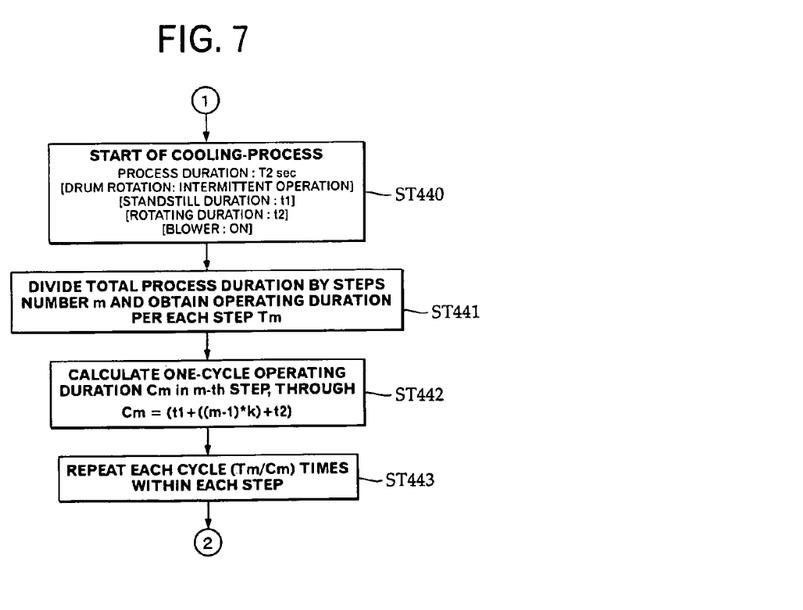
FIG. 7 is a flowchart for explaining the mixing operation according to the second variant example.

Referring to FIG. 7, the controlling mode of the second variant example will be discussed utilizing a flowchart. Because each of the process from Start to the end of the maturing process (step ST414) and the process from the end of the cooling process (step ST419) to complete stop is the same as that of the foregoing embodiment, the explanation therefor will be omitted.

After the maturing process 300 ends, the controlling means initiates the cooling process 200 (step ST440). In the cooling process 200, with the blower being kept on, the controlling means calculates the duration to be set, based on the cooling-process duration T2 seconds, the standstill-cooling-operation duration t1, and the mixing-cooling-operation duration t2 that have been inputted in steps ST 403, 405, and 406 in FIG. 4, respectively, and issues driving and driving-stop commands to the driving means, thereby intermittently rotating the container 20.

In the first place, the controlling means evenly divides the total operating duration T2 (Tm=T2/m) by the number of steps m (step ST441). The controlling means calculates the operating duration of one cycle in the m-th step Cm, through the equation Cm=(t1+((m+1)×k))+t2 (step ST442). Utilizing the results calculated, the controlling means recurrently carries out the cycle (Tm/Cm) times within each operating duration Tm (step ST443). After step ST448 ends, the controlling means moves to step ST419 in FIG. 4.

In addition, in the foregoing embodiment, the blowing means (blower) is kept on throughout the cooling process 200; however, controlling the air volume in line with the cycle status or other methods may be employed. Various kinds of variant examples, as long as they meet the rotating mode of the container 20, are included in the present invention.

Hereinbefore, the preferable embodiment of the present invention has been discussed with reference to the attached drawings; however, the present invention is not limited to the embodiment herein. Various kinds of variant examples or modified examples that may be inferred by any person who is engaged in the food-processor field and has an ordinary skill in the art, within the scope of the technical idea recited in the claims, should be included in the technical scope of the present invention.

What is claimed is:

1. A method of preparing sushi rice comprising:
  retaining in a container cooked rice and sushi dressing in a predetermined ratio depending on an amount of the cooked rice;

mixing the cooked rice and the sushi dressing in the container to perform a mixing process;

performing a maturing process in which neither mixing nor cooling the cooked rice and the sushi dressing is performed; and cooling the cooked rice and the sushi dressing with air to perform a cooling process, the cooling process being performed by a plurality of cycles of a cooling-mixing process, each cycle comprising:

one-cooling operation, having a standstill duration, for merely sending air while keeping the cooked rice without mixing; and another-cooling operation for sending air while mixing the cooked rice, wherein the standstill duration of the one-cooling operation is gradually prolonged in every predetermined number of the cycles; wherein, given that an operating duration, in a first cycle, of the one-cooling operation is t1, a prolonged duration for the operating duration of the one-cooling operation is k (k is a positive number), and an operating duration, in an n-th cycle (n is a positive integer), of the one-cooling operation is tn, an operating duration tn, in the n-th cycle (n is a positive integer), of the one-cooling operation is set in such a way as to meet an equation tn=t1+((n (1)×k).

2. A method of preparing sushi rice according to claim 1, wherein an operating duration of the another-cooling operation is constant in each of the cycles.

3. A method of preparing sushi rice according to claim 1, wherein said cooling-mixing process further includes the mixing process for mixing the cooked rice without sending air into the container.

4. A method of preparing sushi rice according to claim 1, wherein said one-cooling operation and said another-cooling operation are performed continuously.

5. A method of preparing sushi rice according to claim 4, wherein the steps of retaining the cooked rice and sushi dressing, mixing the cooked rice and sushi dressing, performing the maturing process, and cooling the cooked rice and sushi dressing are performed continuously without interruption.

6. A method of preparing sushi rice retaining in a container cooked rice and sushi dressing in a predetermined ratio depending on an amount of the cooked rice; mixing the cooked rice and the sushi dressing in the container to perform a mixing process; performing a maturing process in which neither mixing nor cooling the cooked rice and the sushi dressing is performed; and cooling the cooked rice and the sushi dressing with air to perform a cooling process, the cooling process being performed by a plurality of cycles of a cooling-mixing process, wherein, given that a total duration of the cooling process is T, that an operating duration, in a first cycle, of the one-cooling operation is t1, that an operating duration of the another-cooling operation is t2, that a prolonged duration for the operating duration of the one-cooling operation is k (k is a positive number), and that an operating duration of the one-cooling operation is prolonged in m (m is a positive integer) incremental steps within the total duration, by calculating an average cycle duration Cave of cycles in an m-th step, through an equation Cave=t2 +(t1×m+m(m−1) × k/2)/m, by calculating with the average cycle duration Cave total cycle number n in the total duration T of the cooling process, through an equation n =T/Cave, the operating duration of the one-cooling operation is prolonged every n/m cycles that is obtained by multiplying the total cycle number n by 1/m.

7. A method of preparing sushi rice retaining in a container cooked rice and sushi dressing in a predetermined ratio depending on an amount of the cooked rice; mixing the cooked rice and the sushi dressing in the container to perform a mixing process; performing a maturing process in which neither mixing nor cooling the cooked rice and the sushi dressing is performed; and cooling the cooked rice and the sushi dressing with air to perform a cooling process, the cooling process being performed by a plurality of cycles of a cooling-mixing process, wherein, given that a total duration of the cooling process is T, that an operating duration, in a first cycle, of the one-cooling operation is t1, that an operating duration of the another-cooling operation is t2, that a prolonged duration for the operating duration of the one-cooling operation is k (k is a positive number), and that an operating duration of the one-cooling operation is prolonged in m (m is a positive integer) incremental steps within the total duration, a total operating duration in an m-th step Tm is given by Tm =T/m; an operating duration of one cycle in the m-th step Cm is given by Cm =(t1+((m −1)×k))+t2; and the cycle is recurrently carried out (Tm/Cm) times within each of the operating duration Tm.

* * * * *